(12) United States Patent
D'Agostino

(10) Patent No.: US 7,281,793 B2
(45) Date of Patent: Oct. 16, 2007

(54) IMPACT RESISTANT LENS, FRAME AND TOOLS AND METHOD FOR MAKING SAME

(76) Inventor: Savino D'Agostino, 1083 79th St., Brooklyn, NY (US) 11228

( * ) Notice: Subject to any disclaimer, the term of this patent is extended or adjusted under 35 U.S.C. 154(b) by 6 days.

(21) Appl. No.: 11/079,919

(22) Filed: Mar. 14, 2005

(65) Prior Publication Data
US 2005/0206834 A1  Sep. 22, 2005

Related U.S. Application Data

(60) Provisional application No. 60/553,455, filed on Mar. 16, 2004.

(51) Int. Cl.
*G02C 1/00* (2006.01)
*G02C 7/02* (2006.01)
(52) U.S. Cl. .................... 351/158; 351/174; 351/178
(58) Field of Classification Search ............. 351/158, 351/178
See application file for complete search history.

(56) References Cited

U.S. PATENT DOCUMENTS

| | | | |
|---|---|---|---|
| 2,914,770 A | 12/1959 | Sterne et al. | |
| 5,216,759 A | 6/1993 | Hewitt et al. | |
| 5,862,529 A | 1/1999 | Moodie et al. | |
| 6,045,577 A * | 4/2000 | Woffinden et al. | 623/6.17 |
| 6,241,353 B1 * | 6/2001 | Anger | 351/83 |
| 7,097,305 B2 * | 8/2006 | Delery et al. | 351/177 |

* cited by examiner

*Primary Examiner*—Jordan M. Schwartz
(74) *Attorney, Agent, or Firm*—Kaplan Gilman Gibson & Dernier LLP

(57) ABSTRACT

A corrective/ophthalmic lens comprising an impact lip extending from an anterior lens edge and a radial groove adjacent and parallel to the lens lip posterior surface, an eyewear system containing a corrective/ophthalmic lens and a method of making a lens is provided. The lens impact lip size is variable, determined by frame function and the degree of impact protection that is necessary. A posterior surface of the lens impact lip is beveled with a curvature that preferably substantially matches and coincides with the lens anterior curves, producing a lip with no corrective, low residual power effect or negative image effects. Due to the absence of image change and effects through the lens impact lip, in one aspect the present invention eliminates restrictions to the size of the impact lip.

9 Claims, 9 Drawing Sheets

IMPACT RESISTANT LENS, FRAME AND TOOLS AND METHOD FOR MAKING SAME

CROSS REFERENCE TO RELATED APPLICATION

This application claims the benefit of U.S. Provisional Patent Application No. 60/553,455, entitled Cosmetic Impact Bevel For Eyewear by inventor Savino D'Agostino, filed Mar. 16, 2004, the entire disclosure of which is hereby incorporated by reference.

BACKGROUND OF THE INVENTION

This application is directed to lenses and more particularly to beveled eyewear lenses, methods for producing such lenses, eyewear incorporating such lenses and a tool for making such lenses.

Protective eyewear for sports activities is widely recommended by safety and sport organizations for individuals participating in any sport activity. Many different designs of protective prescription sport eyewear exist, with varying degrees of protection depending on the range of danger associated with the particular sport. Selection charts are published which illustrate the different types of protection available and set forth recommendations as to which of the protective device is most suitable for a given sport. An example of such a selection chart is available in the American National Standards, Z87.1 (2003) published by the American National Safety Institute.

With shatterproof polycarbonate lenses being the standard-of-care for all safety sport eyewear, frame failure has become the chief concern in protective safety eyewear/goggles. Frame failure is generally considered to consist of any detachment of the lens from the frame or any full thickness penetration of the lens.

Most sport related frames, by design, incorporate a thicker-gauge frame (plastic or metal), shock absorbing padding and a common sport V-bevel lens edge which is mounted to a frame which has a matching V-channel with a posterior retention lip which extends further inward (centrally) of the eyewear opening providing a stopping ledge for the lens when impacted.

A more recent method of edging/beveling lenses into sport related eyewear/goggles is a flat posterior beveled lens mounted/inserted into a frame with a matching flat posterior eyewire retention lip so that upon impact, the frontal impacting force is perpendicular to the eyewire flat lip, thereby increasing the frame and lens resistance to failure.

However, these methods of edging/beveling lenses for sport and protective oriented eyewear/goggles suffer certain common drawbacks.

For example, common to all sport and impact protective eyewear is a thicker-gauge frame combined with poor placement of shock absorbing padding, which causes the frame to sit higher and further from the wearer's eyes than the optimum (vertex distance) fitting distance of 13 to 15 mm giving a consistent visual perception change and sacrifice in comfort each time a wearer switches to a protective sport frame.

In addition, as with all channel eyewire retention systems (V-channel or flat lip), there is an inherent weakness in the lens to frame design due to a division of strength and function within the frame eyewire. Of the total eyewire thickness, the portion of frame eyewire anterior to the eyewire channel apex, the main purpose of which is to secure the lens into the frame and prevent the lens from falling out forward (away from the eye), has little bearing on impact force resistance. The portion of eyewire posterior of the channel apex, which carries the main burden of impact bearing forces, is relatively small, necessitating increased eyewire thickness.

A recent addition of sport safety bevel to the optical industry combines an anterior V-bevel with a posterior flat lip bevel, which is mounted/seated in a frame with a channeled eyewire. Although a flat lip bevel is new in use to channeled eyewire sports frames, the concept of a flat posterior lip bevel was commonly used in the past with a specific metal frame design named "Porsche," in which the lens was mounted to the front frame surface and retained by prongs.

In common dress eyewear, "hide-a-bevel" is an industry standard for minimizing the negative effects of a lens edge and thickness. Hide-a-bevel is a lens edge beveling technique where the V-bevel protrudes a minimum amount necessary for keeping a lens mounted to a frame eyewire, with the remaining edge thickness being at an angle parallel to the mechanical center axis.

Another method used in conjunction with the hide-a-bevel for minimized edge effect is the one-third edge bevel rule of thumb, in which of the total lens edge thickness, the apex of the V-bevel is positioned one-third of the thickness from the lens front edge.

Used in conjunction with the one-third rule of thumb, the hide-a-bevel maximizes a lens edge cosmetic appearance by disguising a lens edge and bevel as much as possible.

Common dress frame eyewires also conform to the same methods for lens edge camouflage in that the channel is placed in proximity to the anterior third of the eyewire thickness. Occasionally, channel placement may vary according to thinness of eyewire.

Unfortunately, methods for enhancing lens cosmetic value do not apply for protective eyewear. As the name implies, it is important in dress eyewear to hide the bevel. It is the bevel that accentuates a lens edge thickness and image effect.

There is a negative cosmetic value associated with protective sport lip bevel designs in that, due to the centrally inward extension of the posterior lip of the lens, in conjunction with a minimum thickness standard of 2.0 millimeters polycarbonate lens, there is an exaggeration in unwanted tunneling effect of the lens. In non-sport and dress beveled lenses this effect is only apparent in higher-powered prescription lenses and is further concealed by use of the "hide-a-bevel" that reduces both V-bevel depth and the inward extension of the posterior portion of a lens residual lens thickness. In sport protective eyewear, the negative cosmetic effect is compounded by non-concealed frosted lens edges.

A further concern of protective sport eyewear is the larger lens size needed for increased peripheral vision, which, with the exception of corrective power, increases all frame and lens parameters including image effects. With an increased lens size, the lens becomes thicker and a rise in negative image effects including peripheral lens distortion occurs.

The frame facial wrap (face form) is used in sports eyewear for a more natural, snug fit to accommodate a larger lens and frame size. The frame wrap also minimizes peripheral distortion by attempting to maintain a constant distance of lens posterior surface from wearer's eye. There is an associated increase in the curvature of the lens anterior and posterior surfaces to accommodate a more curved frame and to minimize peripheral distortion. The steeper lens curves radically increase a lens thickness regardless of power and size. When combined with a larger lens size the thickness results are alarming. With the increased lens edge thickness, residual thickness becomes a greater issue in that, even with posterior shifting capabilities (where possible) a lens must not protrude from the posterior surface of the frame. The steeper curve also increases the lens edge and bevel angles, amplifying the unwanted negative image and cosmetic effects to both wearer and onlookers.

In view of the foregoing, it is clear current sports eyewear incorporate all the "don'ts" of cosmetic eyewear. Although impact protective, these designs exaggerate the same negative aspects that the optical industry has been trying to minimize.

Moreover, with an increase in consumer demand for large wrap-type corrective eyewear, the need for lens edge camouflaging is becoming a necessity in all eyewear designs. The hide-a-bevel method, due to its minimal bevel, and current retention lip designs are inadequate to accommodate large wrap-type eyewear for the reasons mentioned hereinabove. Channeled eyewear frame designs transmit and condense impacting forces to the frame eyewear retention lip. The frame designs accommodate a lens v-beveled edge, which creates a wedge effect that can result in eyewear splitting along the channel apex. The hide-a-bevel is not effective in addressing the problems associated with wrap-type eyewear because of insufficient bevel surface.

The use of heat for lens insertion for plastic frames can give rise to significant drawbacks. For example, human errors are possible because there are no instruments to accurately measure the amount of heat needed for different types of plastic in frames of varying thicknesses, compounded by varying edge thickness of a lens due to corrective power and shape. Heat insertion can cause a warping and/or twisting of the frame eyewire, changing the contact points of lens to frame. Stretching causes weak points along the eyewire and throws off the sizing ratio of frame to lens.

Corrective eyeglass wearers are just as concerned with the aesthetics of frame and lens appearance as they are with visual performance. Thus there is a need for a lens retention system and method of edge beveling for both protective and dress eyewear lenses which would minimize and disguise lens thickness while maintaining a high level of safety.

It would therefore be desirable to provide an ophthalmic lens with increased resistance to breakage and resistance to dislodgement from an eyewear frame wherein the outer circumferencing edge of the corrective lens has no corrective power, thereby avoiding negative image effects associated with corrective lens edges.

It also would be desirable to provide an outer circumferencing edge of a corrective lens permitting the lens impact bevel to be shifted anteriorly or posteriorly according to lens corrective strength and/or function, i.e., sports specific or common dress eyewear, for maximizing lens protective and cosmetic values without jeopardizing the integrity of frame impact protection.

SUMMARY OF THE INVENTION

In order to address the shortcomings of the aforementioned prior art, according to at least one aspect the present invention provides a corrective lens comprising a lip having substantially no corrective power that can be employed in conjunction with ophthalmic frames or goggles in which the frames/goggles eyewire has matching contours of the lens edge. The arrangement according to at least one aspect of the present invention increases the resistance of a frame to breakage or failure of retaining the lenses in the frame when impacted by an object. In accordance with at least one aspect of the present invention, a corrective/ophthalmic lens comprises a lip extending from an outer anterior lens edge and a radial groove adjacent and parallel to the lens lip posterior surface. The lens lip size is variable, determined by frame function and design, i.e., the degree of impact protection that is necessary. The lip preferably has little or no corrective power, eliminating negative image effects associated with corrective lens edges and current methods of lens edge bevels.

The posterior surface of the lens impact lip is beveled with a curvature that preferably substantially matches and coincides with the lens anterior curves, producing a lip with no corrective, low residual power effect or negative image effects. Due to the absence of image change and effects through the lens impact lip, in one aspect the present invention eliminates restrictions to the size of the impact lip. Accordingly, the lens impact lip can now be made larger providing a greater surface area of frame eyewire to be utilized upon impact of an object.

Beveling according to the present invention permits the lens impact bevel to be shifted anteriorly or posteriorly according to lens corrective strength and/or function for maximizing lens protective and cosmetic values without jeopardizing the integrity of the frame with respect to impact protection. The shifting of beveled placement directly and proportionally affects the lens impact with thickness. For example, a posterior shift of the lens bevel accommodates and disguises lens thickness and increases the impact lip thickness producing a greater protective and cosmetic value.

A beveling tool in accordance with the present invention is also disclosed. The beveling tool is adapted to produce a lens in accordance with the present invention.

A lens rest device in accordance with the present invention is also disclosed, adapted to be used in preparing lenses in accordance with the present invention.

A system comprising a lens and lens retaining body having improved impact resistance are disclosed in accordance with at least one aspect of the present invention.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1:
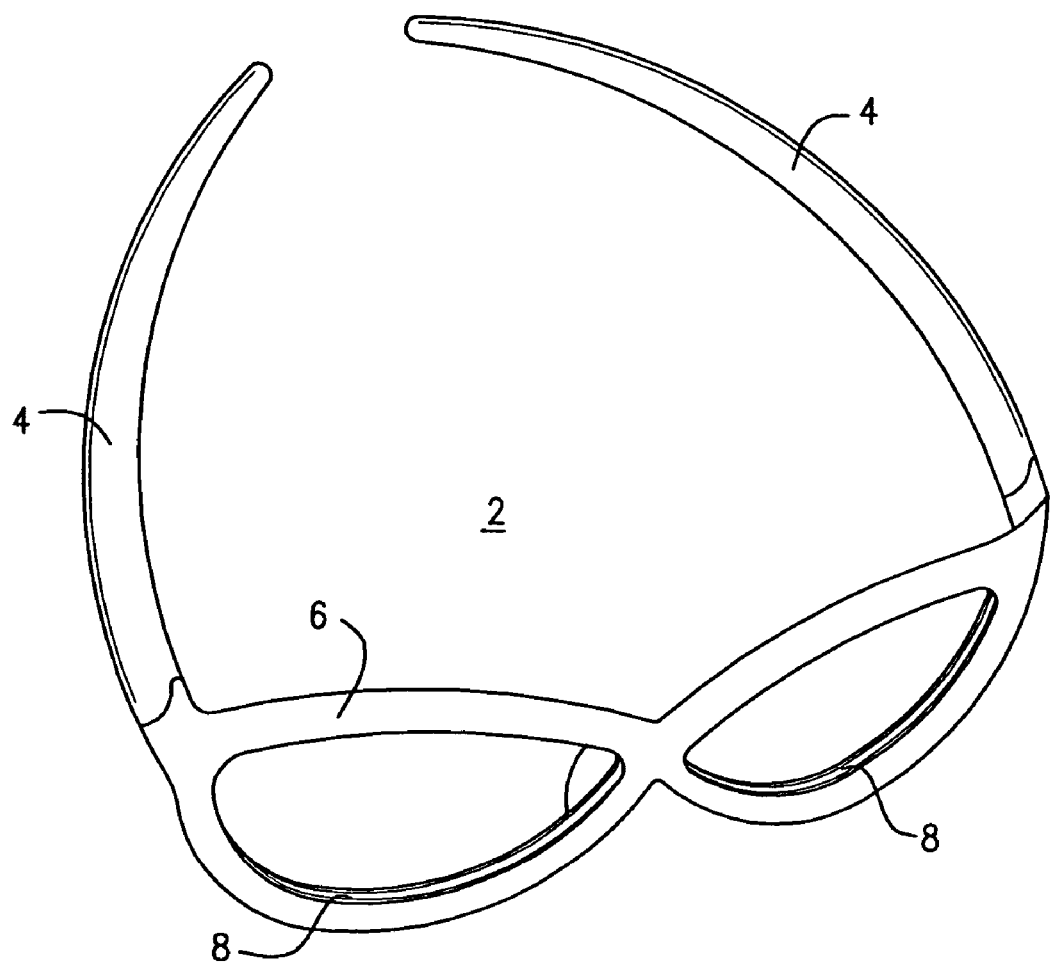
FIG. 1 is a front perspective view of an eyewear frame in accordance with at least one aspect of the present invention.

Now referring to FIG. 1 eyewear 2 in accordance with at least one aspect of the present invention is disclosed comprising temples 4, lens retention body 6 and eyewire impact seat 8.

Figure 2:
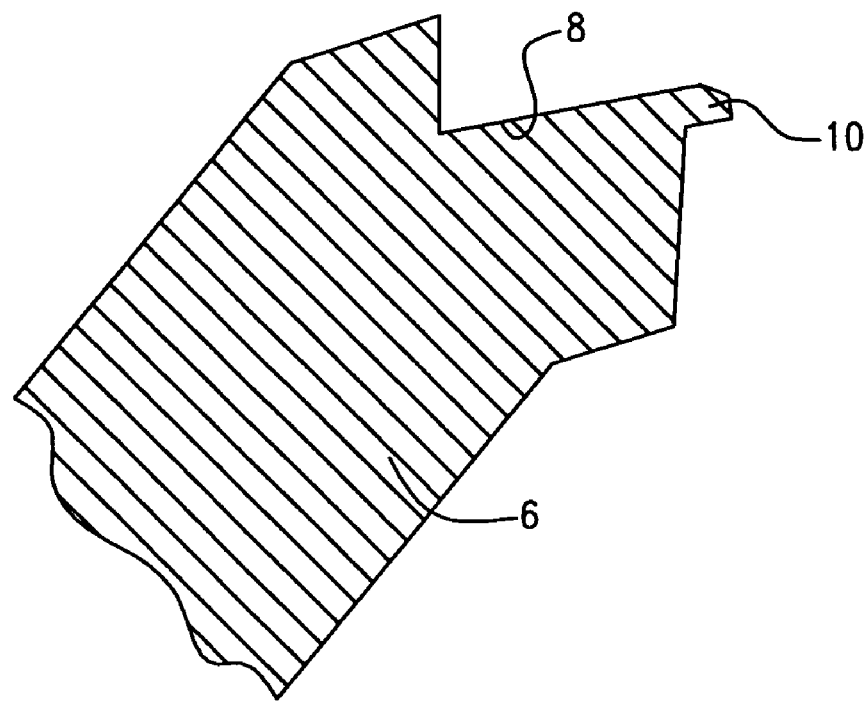
FIG. 2 is a top, cross-sectional view of an eyewear frame in accordance with at least one aspect of the present invention.
Figure 2A:
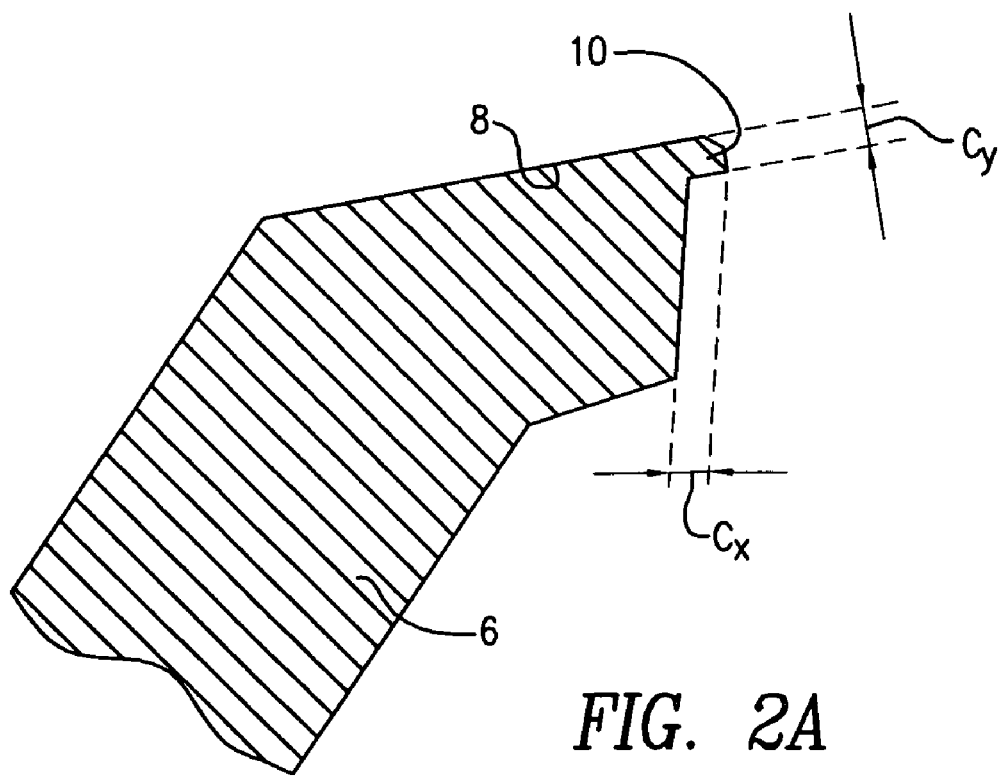
FIG. 2A is a top, cross-sectional view of an eyewear frame in accordance with at least one aspect of the present invention.

Now referring to FIGS. 2 and 2A, in a preferred embodiment lens retaining body 6 comprises eyewire impact seat 8 and eyewire fitting lip 10.

Figure 3:
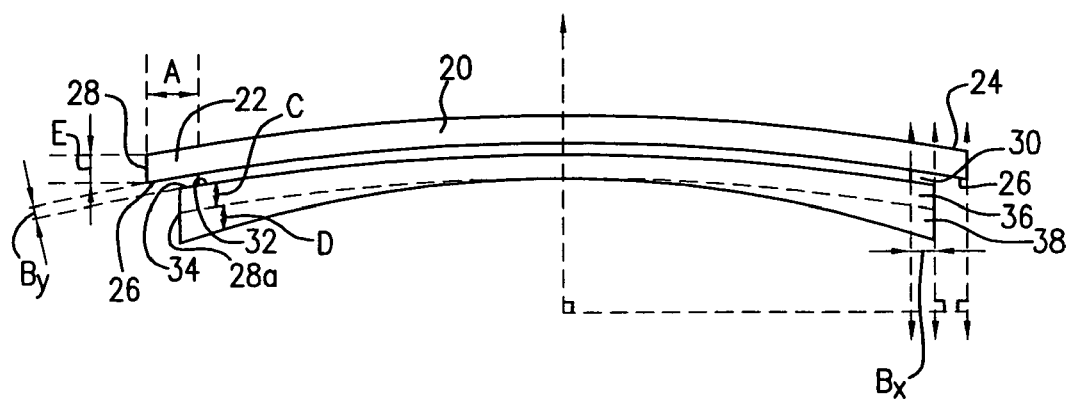
FIG. 3 is a top view of an eyewear lens in accordance with at least one aspect of the present invention.

Now referring to FIG. 3 in accordance with at least one aspect of the present invention lens 20 comprises lens impact retention lip 22 having an anterior surface 24, posterior surface 26, and an outer circumferencing edge 28. Lens 20 further comprises lens retaining groove 30 comprising groove bottom 32, lens retaining lip 36 comprising lens retaining wall 34, and posterior surface 26.

A lens in accordance with the present invention is preferably produced by grinding or edging a circumferencing edge of a corrective lens in a manner that produces a lens impact retention lip 22 having an outer circumferencing edge 28, a groove 30 adjacent and parallel to impact lip posterior surface 26 and a lens retaining lip 36 having an inner circumferencing edge 28a. Lens impact retention lip 22 is preferably predetermined in size by frame, function, and design as discussed in further detail hereinbelow and provides a large surface area with which the frame eyewire is engaged, increasing the impact resistance of the eyewear.

Outer circumferencing edge 28 and impact retention lip 22 preferably have little or no corrective power to eliminate negative image effects associated with typical corrective lens edges and current method of lens edge beveling. Specifically, the posterior surface 26 of lens impact retention lip 22 is preferably beveled and/or polished with a curvature that matches and coincides with the curve of anterior lens surface 24 producing a lens impact retention lip 22 with essentially no corrective or residual power effect or negative image effect. Concomitantly a lens 20 in accordance with the present invention eliminates restrictions to the size of the impact lip 22. Applying the teachings of the present invention, the impact retention lip 22 can be made larger, providing a greater surface area for contacting the frame eyewire. The thickness of impact lip 22, shown as measurement E in FIG. 3, preferably ranges from about 0.5 mm to about 3.0 mm in casual or dress eyewear and from about 2 mm to about 3 mm in sport applications where the minimum thickness required is 2 mm. The thickness E in sport application could be less than 2 mm in the event standards are modified to allow a smaller thickness.

The posterior curve of impact lip 22 is determined by frame function and design, but preferably matches the curve of anterior curvature of lip 22.

Figure 5:
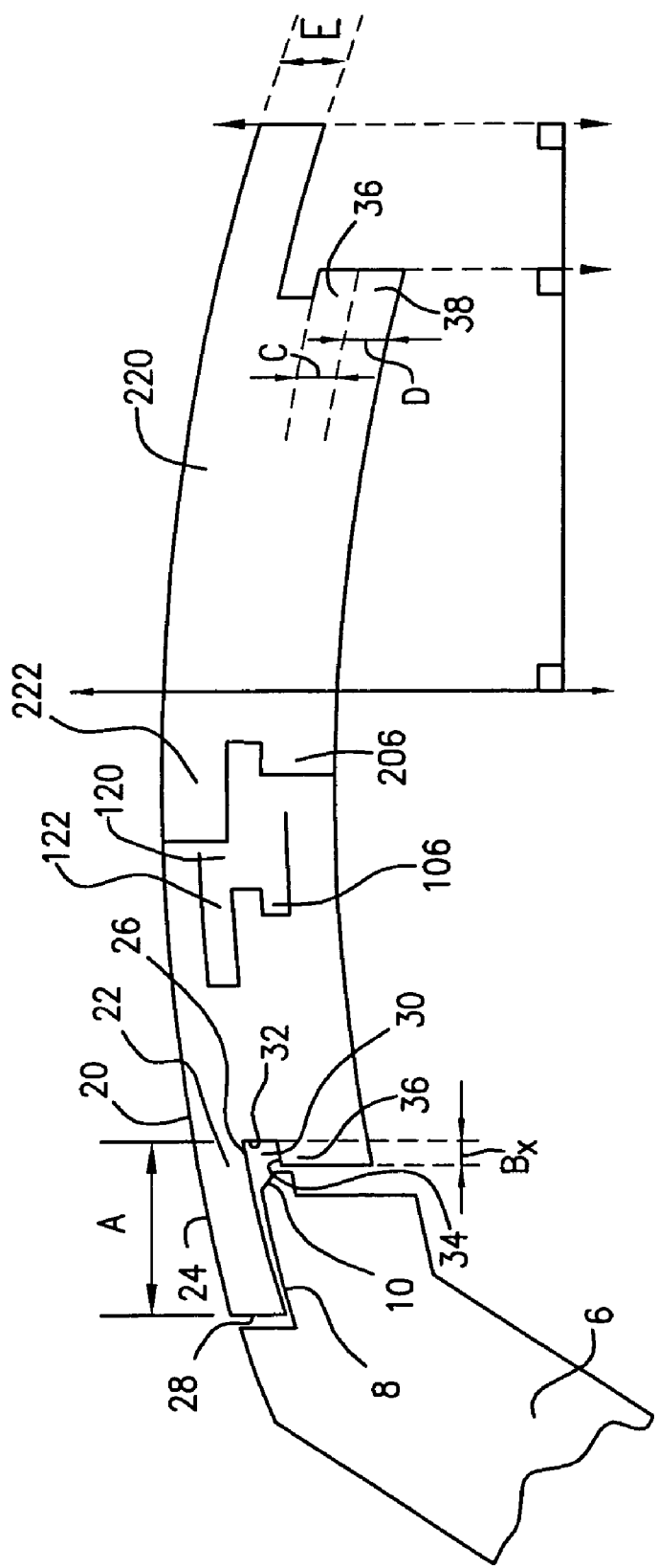
FIG. 5 is a top, cross-sectional schematic view of lens shifting in accordance with at least one aspect of the present invention.

The length of impact lip as designated by measurement A in FIG. 3 is preferably from about 0.5 mm to about 2 mm greater than the measurement of dimension $B_x$ in FIGS. 3 and 5 (which represents the depth of retaining groove 30 and the length of lens retaining lip wall 34) in casual eyewear applications and about 1.5 mm to about 2.5 mm longer than dimension $B_x$ in sport applications. In either case, casual or sport applications, the measurement A preferably is greater than the dimension $B_x$ in FIGS. 3 and 5.

Figure 4:
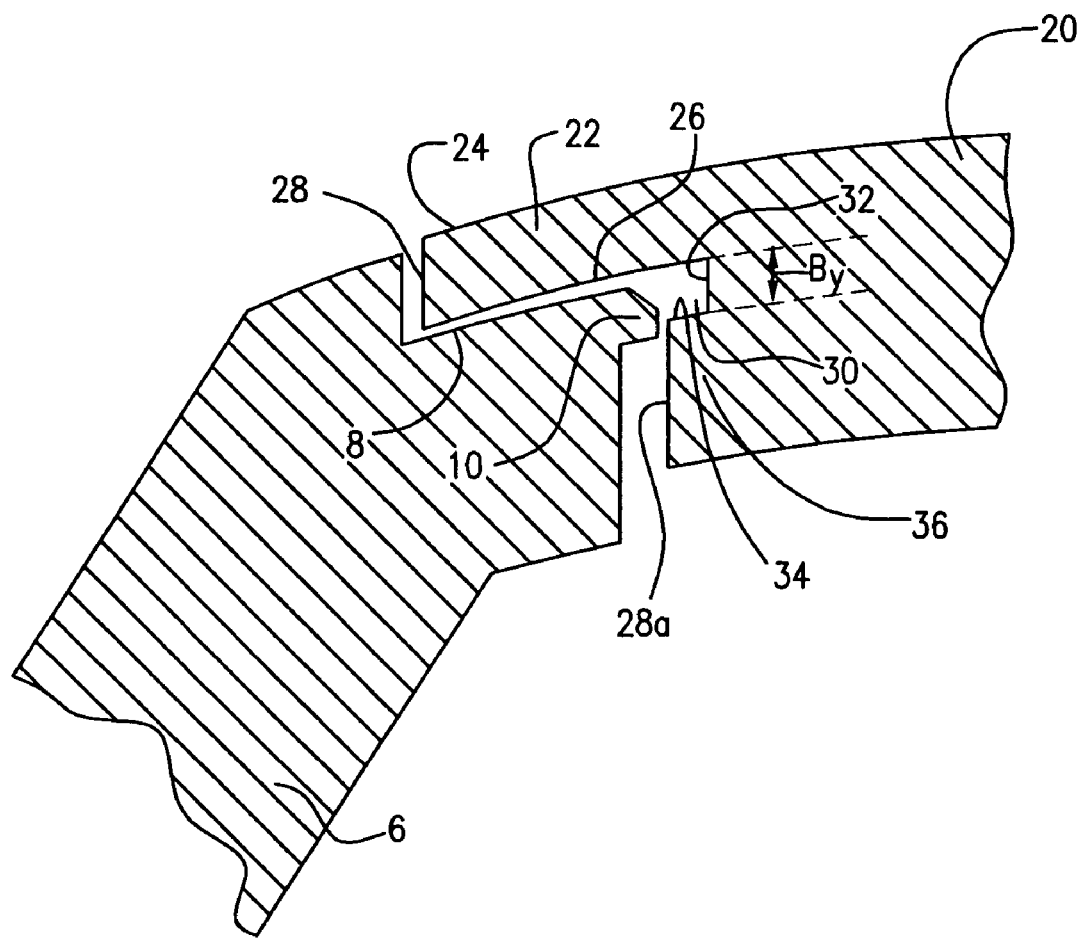
FIG. 4 is a top, cross-sectional view of an eyewear frame and lens system in accordance with at least one aspect of the present invention.

Now referring to FIG. 4 lens retaining groove 30 is adapted to retain a lens 20 to a lens retaining body 6. The depth of lens retaining groove 30 is determined by frame function, i.e., whether the eyewear frame is to be employed as sport specific protective eyewear, dress eyewear, etc. Typically, groove 30 will have a greater depth in applications requiring higher impact resistance. In such cases, eyewire fitting lip 10 will be more pronounced so as to securely engage groove 30. In applications where impact resistance is not critical the depth of groove 30 can be decreased. The depth of groove 30, denoted by dimension $B_x$ in FIGS. 3 and 5, is preferably in the range of from between about 0.50 mm and about 3.0 mm, preferably between about 0.75 mm and about 2.0 mm, and most preferably between about 1.0 mm and about 1.75 mm in applications requiring high impact resistance.

Groove 30 has a width (dimension $B_y$ in FIGS. 3 and 4) that typically ranges from about 0.5 mm to about 3.0 mm, preferably between about 0.75 and about 2.0 mm and most preferably between about 1.0 mm and about 1.75 mm.

In one embodiment groove 30 is continuous around the circumferential edge of a lens. In an alternate embodiment, plural intermittent grooves 30 are formed along the circumferential edge of a lens to accommodate different types of lens retention bodies 6 such as but not limited to half rims, partial rims and the like.

Lens retaining lip 36 comprises lens inner circumferencing edge 28a, comprising lens retaining wall 34 as the anterior surface of lens retaining lip 36. The thickness of retaining lip 36 is predetermined by frame function and design and is of the minimum thickness needed to retain a lens to its frame. In lenses where there is an excess amount of retaining lip thickness, the excess thickness is referred to herein as residual edge thickness 38, i.e., that thickness in excess of what is required to retain a lens to its frame.

Dimension $B_x$ of lens retaining wall 34 is identical to the dimension ranges stated hereinabove with respect to groove 30. Thickness C of retaining lip 36 is in the range of from about 0.5 mm to about 3.0 mm, preferably between about 0.75 and about 2.0 mm and most preferably between about 1.0 mm and about 1.75 mm. Residual thickness 38, denoted as D, is variable.

Eyewire impact seat 8 preferably is fabricated such that its curvature matches and coincides with the curvature of posterior surface 26 of lens impact lip 22, such that when the lens 20 is impacted, forces transmitted by the lens 20 will be evenly distributed along the eyewire impact seat 8. The combination of a larger lens impact lip 22 and the corresponding impact seat 8 of the eyewear lens retention body 6 reduces the area of concentrated stress, spreading the burden of impact resistance between the lens retaining body 6 and lens 20. Unlike conventional channeled eyeware frame designs that transmit and condense impacting forces to the frame eyewear retention lip, the lenses in accordance with the present invention contribute to impact force resistance. In accordance with the present invention, the frame is made available as a buffer for a lens when impacted by an object. In one embodiment wherein the posterior surface 26 and eyewire impact seat 8 are not in parallel, a non-adhesive material such as silicon can be employed to fill gaps between the frame and lens to achieve a disappearing effect. Alternatively, a soft frame material can be used to fill gaps. Such material can be clear or colored and comprise an adhesive or non-adhesive, such as a rubberized material.

Preferably, lip 22 does not have a corrective power as a result of matching curvature of anterior and posterior surfaces of lip 22. However, in one embodiment, impact seat 8 is opaque to minimize peripheral vision distortion experienced by the wearer when lip 22 has a corrective aspect. An opaque impact seat 8 also maximizes cosmetic appeal by concealing lens thickness.

Eyewire impact seat 8 extends radially inward terminating in circumferential eyewire fitting lip 10 to which lens retaining groove 30 is fitted. Eyewire fitting lip 10 preferably includes a slight angle on its anterior inward edge, permitting the lens 20 to be snap fitted to the frame without the use of heat. Eyewire fitting lip 10 also is adapted to camouflage and/or conceal the thickness of a lens edge. That is, some or all lens 20 thickness beyond the retaining lip wall 34 is concealed by the eyewire fitting lip 10. The eyewire fitting lip 10 advantageously prevents distortion at the edge of the vision of the wearer.

Now referring to FIGS. 2A, 4 and 5, the dimensions of impact seat 8 and eyewire fitting lip 10 are complementary to the corresponding elements of lens 20. According to one embodiment, the length of eyewire fitting lip 10, designated $C_x$ in FIG. 2A, is preferably in the range of from between about 0.50 mm and about 3.0 mm, preferably between about 0.75 mm and about 2.0 mm, and most preferably between about 1.0 mm and about 1.75 mm in applications requiring high impact resistance. According to one embodiment, the width of eyewire fitting lip 10, designated $C_y$ in FIG. 2A, is preferably in the range of from between about 0.5 mm to about 3.0 mm, preferably between about 0.75 and about 2.0 mm and most preferably between about 1.0 mm and about 1.75 mm.

In another embodiment lens 20 is employed in conjunction with a conventional channeled eyeware frame wherein impact lip 22 engages a channel of a conventional frame. This embodiment is useful in applications where lens retention issues exist due to high lens corrective power, large lens size and/or increased eyewire curvature such as in wrap-type frame designs.

In another embodiment lens 20 is employed in conjunction with wire-type frames, wherein the eyewire comprises a thin ribbon of metal that engages groove 30.

Now referring to FIG. 5, a method is disclosed of beveled placement of the outer circumferencing edge of a corrective lens permitting the groove 30, and hence, the lens impact lip 22, to be shifted anteriorly or posteriorly according to lens corrective strength and/or function for maximizing lens protection or cosmetic value without jeopardizing the integrity of the frame with respect to impact protection. A posterior shift of the groove 30 to accommodate and disguise lens thickness increases the thickness of impact lip 22 producing greater protective and cosmetic value. FIG. 5 depicts lenses 20, 120 and 220 having impact lips 22, 122 and 222, respectively, of varying thicknesses (e.g., designated "E" in lens 220). In accordance with at least one aspect of the present invention, a corrective lens of a particular corrective power can be adapted to a sports specific eyewear by shifting the groove 30 posteriorly, resulting in a thicker impact lip 22, while a lens having the same corrective power and thickness can be adapted to a common dress eyewear application by shifting the groove 30 anteriorly. In either case, the corrective power of the lens 20 is not affected and the circumferential edge of the lens 20 is camouflaged and/or concealed by the eyewear impact seat 8 and eyewire fitting lip 10.

Figure 6:
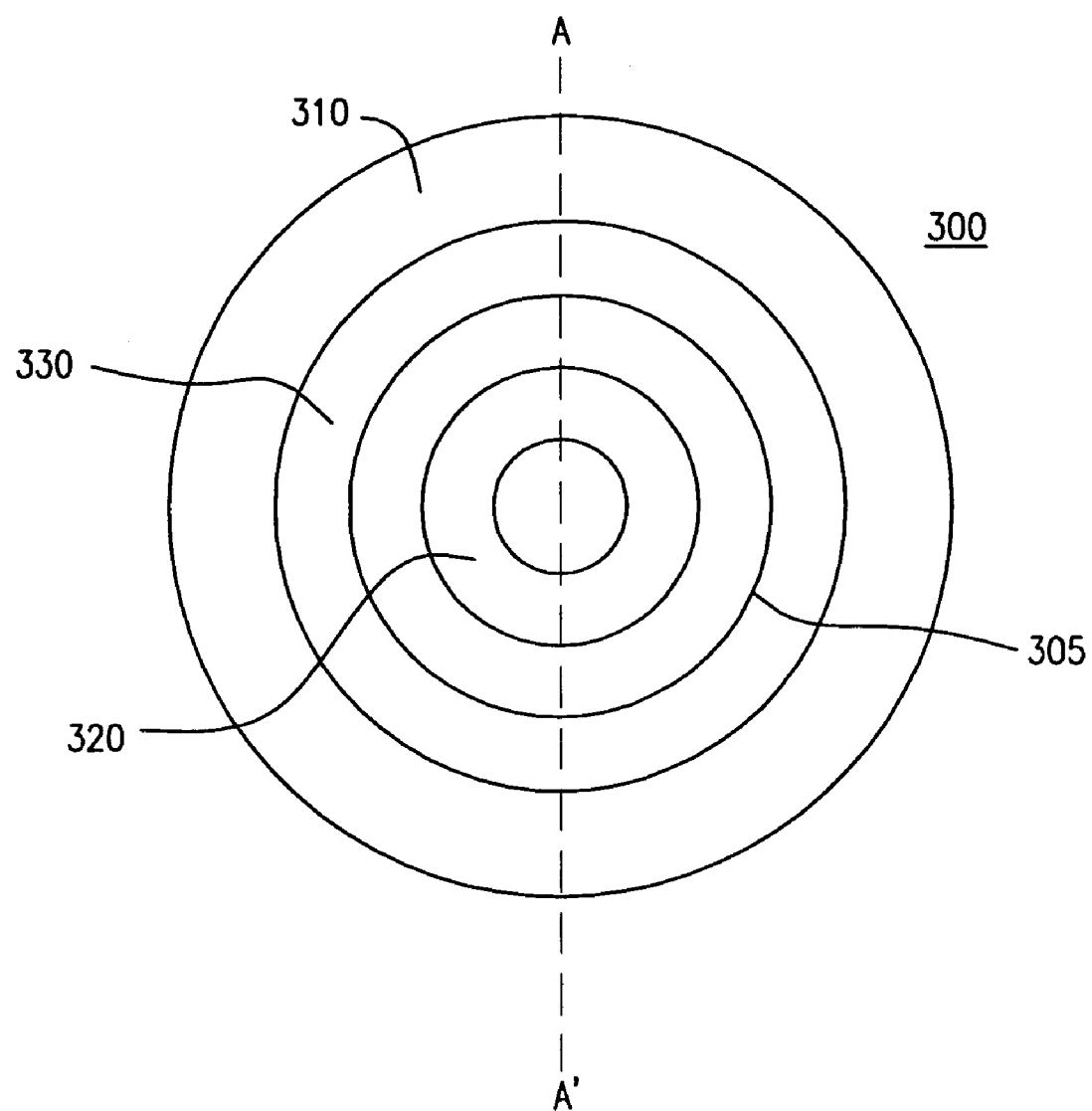
FIG. 6 is a top plan view of a lens beveling tool in accordance with at least one aspect of the present invention.
Figure 6A:
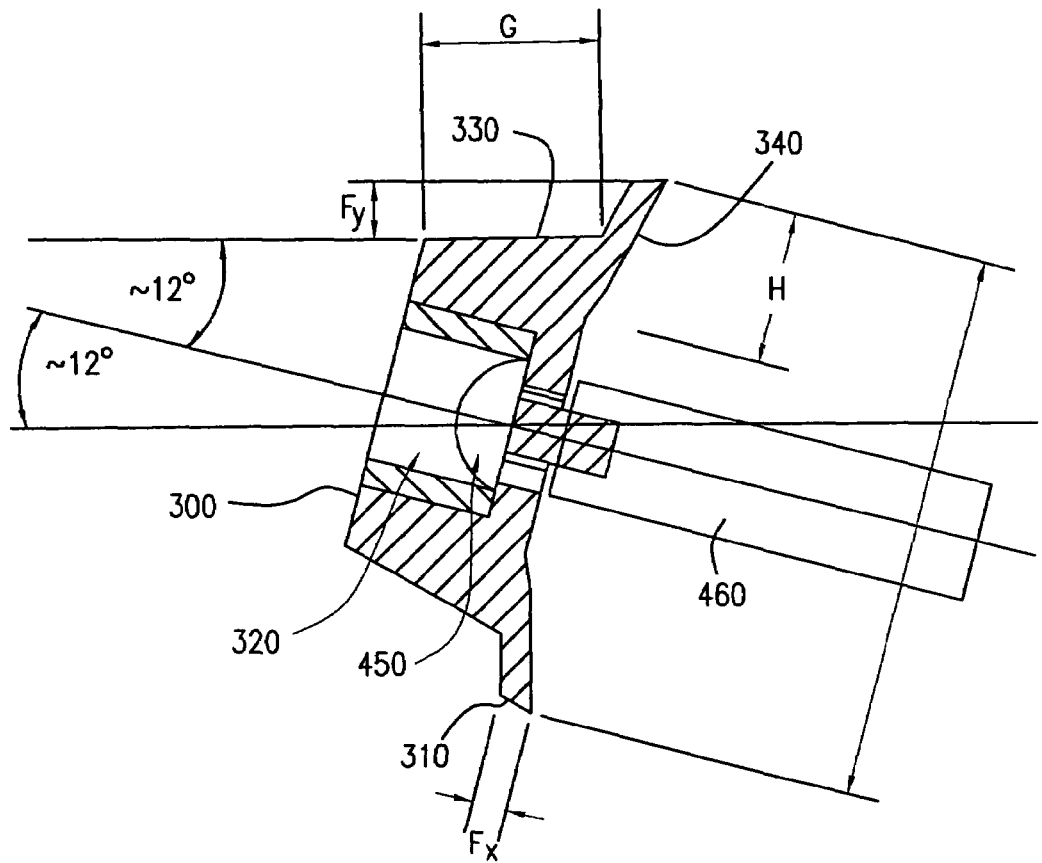
FIG. 6A is a side cross-sectional view of a lens beveling tool in accordance with at least one aspect of the present invention.

Now referring to FIGS. 6 and 6A, a beveling wheel 300 in accordance with at least one aspect of the present invention comprises a frustoconical body 305 having a grooving lip 310 extending radially therefrom, a mounting aperture 320 centrally disposed in said body 305, a retaining lip grinding area 330, and impact lip posterior curve grinding area 340. Beveling wheel 300 has a diameter between about 22-28 mm, preferably about 25 mm. Grooving lip 310 has a width denoted by dimension $F_x$ of between about 0.5 mm and about 3.0 mm, preferably between about 0.75 mm and about 2.0 mm and most preferably between about 1.0 mm and about 1.75 mm. Mounting aperture 320 accommodates a mounting device such as a screw 450 for mounting the beveling wheel 300 to a beveling wheel shaft 460 of an existing, commercially available groover or lens edger having grooving capabilities. Beveling wheel 300 is preferably mounted to a beveling wheel shaft 460 at an angle of about 12° to match industry standards. The depth of grooving lip 310, designated by dimension $F_y$, is between about 0.50 mm and about 3.0 mm, preferably between about 0.75 mm and about 2.0 mm, and most preferably between about 1.0 mm and about 1.75 mm. The final size of retaining lip grinding area 330 is determined by the available fitting area of a frame and the width of retaining lip grinding area 330, designated by dimension G, is typically between about 3 mm to about 9 mm, preferably about 6 mm. Impact lip posterior curve grinding area 340 typically has a width, designated by dimension H, of between about 3 mm to about 9 mm, preferably about 6 mm.

A beveling wheel 300 in accordance with the present invention provides an advantageous grooving wheel lip angle and is capable of producing grooves that are less perpendicular to the lens edge, and therefore is more versatile, than conventional grooving wheels which produce perpendicular grooves and are limited in the ability to provide deep grooves. A beveling wheel 300 in accordance with the present invention is capable of cutting deeper grooves without increasing wheel diameter. Increased wheel diameter has the drawbacks of potential loss of torque, production of more linear cuts, an outward flanging of grooves and an introduction of error in computerized placement choice.

Figure 7:
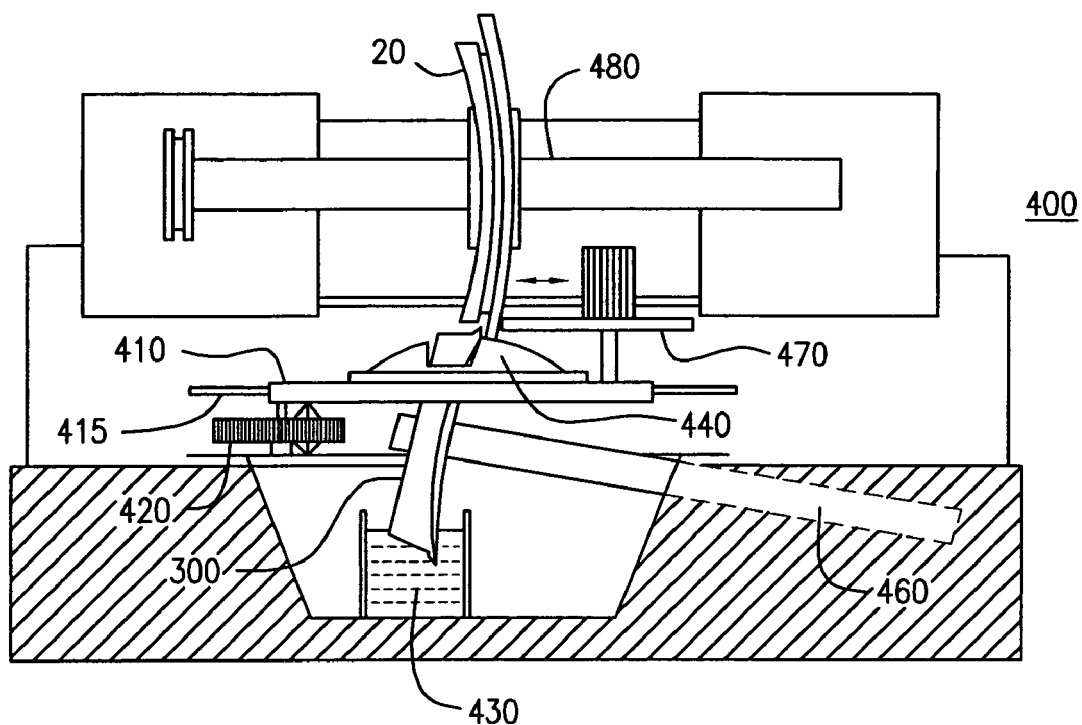
FIG. 7 is a side, partial cross-sectional view of a system in accordance with at least one aspect of the present invention.
Figure 8:
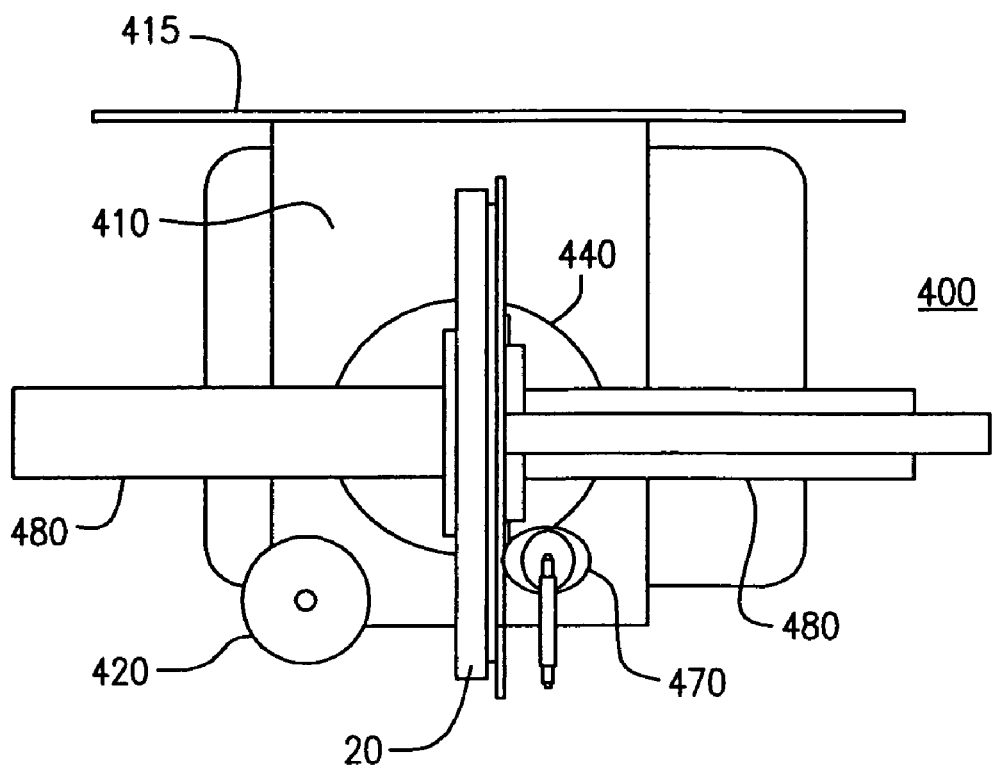
FIG. 8 is a top plan view of a system in accordance with at least one aspect of the present invention.

Now referring to FIGS. 7 and 8, beveling wheel 300 and lens 20 are shown in association with a groover device 400, said groover device 400 comprising lens rest table 410, pivot shaft 415, depth adjustment 420, water reservoir 430, lens rest 440, beveling wheel shaft 460, placement adjustment 470 and lens clamp 480.

Figure 9:
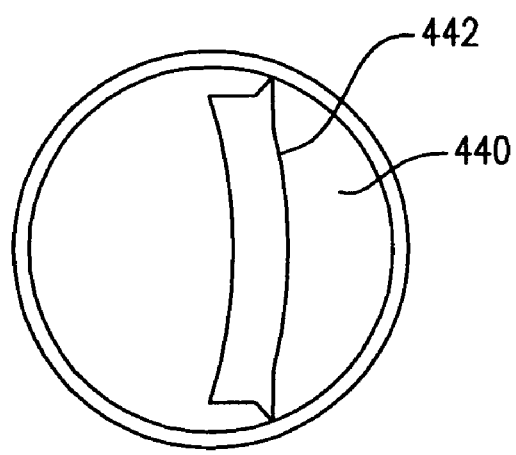
FIG. 9 is a top plan view of a preferred embodiment of a lens rest in accordance with at least one aspect of the present invention.

Now referring further to FIG. 9, lens rest 440 is adapted to accommodate beveling wheel 300, i.e., lens rest 440 includes an aperture 442 shaped to accommodate grooving lip 310 of beveling wheel 300. In accordance with one aspect of the present invention, a method is provided for creating a lens rest 440 that will accommodate a beveling wheel 300 in accordance with the present invention, comprising the steps of mounting a beveling wheel 300 on the beveling wheel shaft 460 of a conventional, commercially available, or other groover device 400 and disposing said lens rest 440 over said beveling wheel 300, activating said groover device 400, such that said beveling wheel 300 grinds an appropriate aperture 442 in said lens rest 440.

In practice, a lens blank is placed in lens clamp 480 and brought into contact with beveling wheel 300. As can be best seen in FIG. 7, the lens edge is simultaneously grooved and beveled by grooving lip 310, retaining lip grinding area 330 and impact lip posterior curve grinding area 340 to produce a lens 20 in accordance with the present invention.

The beveling wheel 300 can be used in any commercially available groover and in any commercially available lens edger having grooving capabilities. For example, beveling wheel 300 can be used in auto groovers such as those commercially available from Briot, Takubomatic and other manufacturers. Beveling wheel 300 may be used in an edger such as the Kappa model edger manufactured by Essilor.

Beveling wheel 300 may also be used to cut the features of the frame into which a lens 20 will be fitted, i.e. impact seat 8 and lip 10.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An eyewear lens having an anterior and posterior surface and a peripheral edge, the lens comprising at least one groove disposed circumferentially in at least a portion of said peripheral edge, at least one anterior lip anterior of said groove, said anterior lip having a posterior wall comprising at least in part an anterior wall of said groove, and at least one posterior lip posterior of said groove, said posterior lip having an anterior wall comprising at least in part a posterior wall of said groove, said anterior lip having an end that extends radially beyond an end of said posterior lip.

2. The invention according to claim 1, wherein at least a portion of said posterior wall of said anterior lip is parallel with at least a portion of said anterior wall of said posterior lip.

3. The invention according to claim 1, said anterior lens surface having a curvature that is substantially the same as a curvature of said posterior wall of said anterior lip.

4. The invention according to claim 1, wherein a curvature of said anterior lens surface and a curvature of said posterior wall of said anterior lip are such that the anterior lip has essentially no corrective power.

5. The invention according to claim 1 said anterior lip having a thickness of between about 0.5 mm and about 3.0 mm.

6. The invention according to claim 1 the end of said anterior lip extending beyond the end of said posterior lip by a length of between about 0.5 mm and about 2.5 mm.

7. The invention according to claim 1, said groove having a depth of between about 0.5 mm and about 3.0 mm and a width of between about 0.5 mm and about 3.0 mm.

8. The invention according to claim 1 said posterior lip having a thickness of between about 0.5 mm and about 3.0 mm.

9. The invention according to claim 1, the posterior wall of the anterior lip having a curvature that is the same as a curvature of the anterior lens surface.

* * * * *